US012119144B2

(12) United States Patent
Lu et al.

(10) Patent No.: US 12,119,144 B2
(45) Date of Patent: Oct. 15, 2024

(54) CABLE AND CABLE ASSEMBLY

(71) Applicants: TE Connectivity Services GmbH, Schaffhausen (CH); Tyco Electronics (Shanghai) Co.Ltd., Shanghai (CN)

(72) Inventors: Hainan (Harlan) Lu, Dongguan (CN); Zhiwei (Jack) Guo, Dongguan (CN); Jonathan Edward Lee, Middletown, PA (US)

(73) Assignees: TE Connectivity Solutions GmbH, Schaffhausen (CH); Tyco Electronics (Shanghai) Co., Ltd., Shanghai (CN)

( * ) Notice: Subject to any disclaimer, the term of this patent is extended or adjusted under 35 U.S.C. 154(b) by 0 days.

(21) Appl. No.: 17/667,170

(22) Filed: Feb. 8, 2022

(65) Prior Publication Data

US 2022/0254544 A1 Aug. 11, 2022

(30) Foreign Application Priority Data

Feb. 9, 2021 (CN) ......................... 202110183019.4

(51) Int. Cl.

| | |
|---|---|
| ***H01B 7/08*** | (2006.01) |
| ***H01B 7/02*** | (2006.01) |
| ***H01B 7/18*** | (2006.01) |
| ***H01B 11/00*** | (2006.01) |
| ***H01B 11/10*** | (2006.01) |

(52) U.S. Cl.

CPC ............. *H01B 7/1855* (2013.01); *H01B 7/02* (2013.01); *H01B 7/1895* (2013.01); *H01B 11/002* (2013.01); *H01B 11/1091* (2013.01)

(58) Field of Classification Search

CPC . H01B 7/02; H01B 7/026; H01B 7/04; H01B 7/06; H01B 7/10; H01B 11/002; H01B 7/08–7/0892

USPC .......... 174/102 R, 108, 110 R, 113 R, 120 R

See application file for complete search history.

(56) References Cited

U.S. PATENT DOCUMENTS

| | | | | |
|---|---|---|---|---|
| 5,483,020 A * | 1/1996 | Hardie | H01B 11/203 174/102 R |
| 5,486,649 A * | 1/1996 | Gareis | H01B 11/1016 174/10 |
| 6,452,107 B1 * | 9/2002 | Kebabjian | H01B 11/002 174/113 R |
| 6,740,808 B1 * | 5/2004 | Chang | H01B 7/0861 174/113 R |
| 8,981,216 B2 * | 3/2015 | Grant | H01B 11/06 174/113 R |

(Continued)

*Primary Examiner* — William H. Mayo, III

(74) *Attorney, Agent, or Firm* — Barley Snyder

(57) ABSTRACT

A cable includes a pair of insulated core wires extending parallel to each other, each of the insulated core wires having a central conductor and a core insulation layer wrapped around the central conductor, an inner insulation layer wrapped around the core insulation layers, a metal shielding layer wrapped around the inner insulation layer, an outer insulation layer wrapped around the metal shielding layer, and a single drain wire disposed between the metal shielding layer and the outer insulation layer. The core insulation layers of the pair of insulated core wires abut against each other at a pair of first sides of the core insulation layers facing toward each other. The single drain wire is located at a second side of the core insulation layer of one of the pair of insulated core wires facing away from the other of the pair of insulated core wires in a radial direction.

20 Claims, 4 Drawing Sheets

(56) References Cited

U.S. PATENT DOCUMENTS

| | | | | |
|---|---|---|---|---|
| 2004/0023101 | A1 * | 2/2004 | Jacobson | H01M 4/8621 429/510 |
| 2015/0228378 | A1 * | 8/2015 | Guetig | H01B 7/0838 174/32 |

* cited by examiner

CABLE AND CABLE ASSEMBLY

CROSS-REFERENCE TO RELATED APPLICATION

This application claims the benefit of the filing date under 35 U.S.C. § 119(a)-(d) of Chinese Patent Application No. 202110183019.4, filed on Feb. 9, 2021.

FIELD OF THE INVENTION

Embodiments of the present disclosure generally relate to a cable and, more particularly, to a cable such as a twin-axial cable and a cable assembly including the same, enabling data transmission at a high transmission rate.

BACKGROUND

A conventional high-speed data transmission cable includes a pair of insulated core wires, a drain wire located between the insulated core wires, a metal shielding layer wrapped around the insulated core wires and the drain wire, and an insulation layer wrapped around the metal shielding layer. However, a high-frequency test bandwidth achieved by such conventional cable is low, the insulated core wire is easy displaceable during a bending use and has poor performance stability, and the drain wire is easy to misplace.

SUMMARY

A cable includes a pair of insulated core wires extending parallel to each other, each of the insulated core wires having a central conductor and a core insulation layer wrapped around the central conductor, an inner insulation layer wrapped around the core insulation layers, a metal shielding layer wrapped around the inner insulation layer, an outer insulation layer wrapped around the metal shielding layer, and a single drain wire disposed between the metal shielding layer and the outer insulation layer. The core insulation layers of the pair of insulated core wires abut against each other at a pair of first sides of the core insulation layers facing toward each other. The single drain wire is located at a second side of the core insulation layer of one of the pair of insulated core wires facing away from the other of the pair of insulated core wires in a radial direction.

BRIEF DESCRIPTION OF THE DRAWINGS

The invention will now be described by way of example with reference to the accompanying Figures, of which.

DETAILED DESCRIPTION OF THE EMBODIMENT(S)

Figure 1:
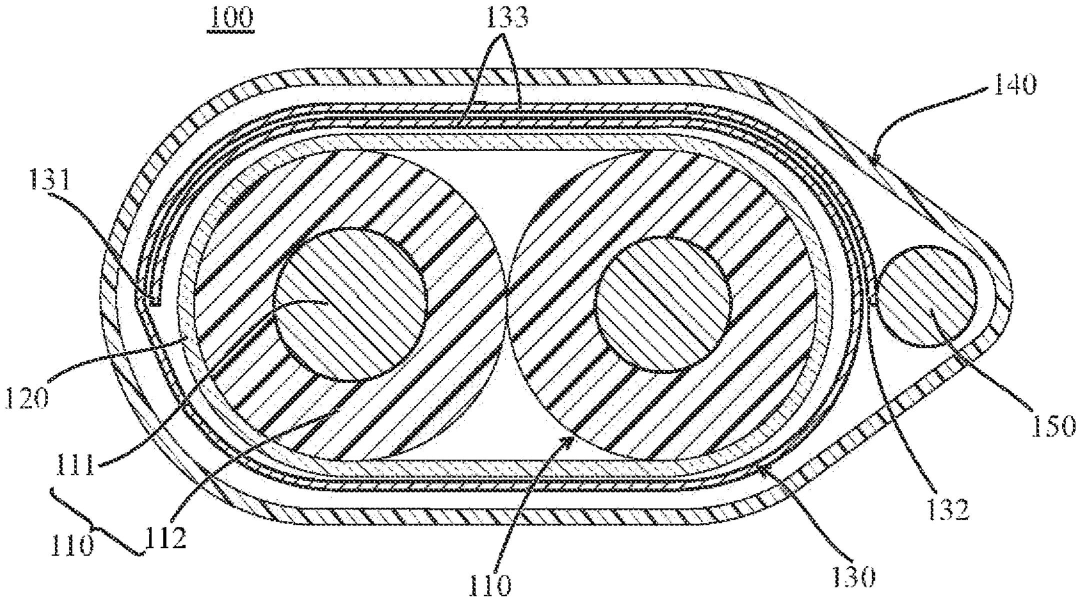
FIG. 1 is a sectional view of a cable according to an embodiment.

Embodiments of the present disclosure will be described hereinafter in detail taken in conjunction with the accompanying drawings. In the description, the same or similar parts are indicated by the same or similar reference numerals. The description of each of the embodiments of the present disclosure hereinafter with reference to the accompanying drawings is intended to explain the general inventive concept of the present disclosure and should not be construed as a limitation on the present disclosure.

In addition, in the following detailed description, for the sake of explanation, numerous specific details are set forth in order to provide a thorough understanding of the disclosed embodiments. It will be apparent, however, that one or more embodiments may also be practiced without these specific details. In other instances, well-known structures and devices are illustrated schematically in order to simplify the drawing.

As shown in FIG. 1, according to an exemplary embodiment of the present disclosure, there is provided a cable 100 which is, for example, a twin-axial or differential cable, and is configured to stably transmit data at a relatively high transmission rate, such as a transmission rate higher than 10 Gbps, for example a transmission rate in the range of 20 Gbps-40 Gbps.

As shown in FIG. 1, the cable 100 according to an exemplary embodiment of the present disclosure includes a pair of insulated core wires 110 for signal or data transmission. The pair of insulated core wires 110 are arranged to extend parallel to each other in a longitudinal direction, and each of the insulated core wire 110 includes a central conductor 111 and a core insulation layer 112 wrapped around the central conductor 111 in a circumferential direction. For example, the core insulation layer 112 may be in the form of an insulation material strip wound around the central conductor 111 in the longitudinal direction. The central conductor 111 may be made of a high-conductivity material such as a copper conductor, a silver-plated wire, and the core wire insulation layer 112 may be made of an insulation polymer material such as polyolefin.

As illustrated in FIG. 1, the cable 100 according to an exemplary embodiment of the present disclosure further includes an inner insulation layer 120, a metal shielding layer 130 and an outer insulation layer 140 that are sequentially arranged from inside to outside. The inner insulation layer 120 is wrapped around the outer core insulation layers 112 of the pair of insulated core wires 110 to fix the pair of insulated core wires 110, such that the core insulation layers 112 of the pair of insulated core wires 110 abut against each other on outer circumferential surfaces thereof at first sides or inner sides facing toward each other. Compared with a conventional cable, since the inner insulation layer 120 is additionally provided between the metal shielding layer 130 and the insulated core wires 110 to fix the insulated core wires 110, the insulated core wires 110 can be prevented from being displaced during use, such as during bending, so as to improve performance stability of the cable 100.

For example, the inner insulation layer 120 may be in the form of an insulation material strip and wound around the core insulation layers 112 of the pair of insulated core wires 110 in the longitudinal direction. For example, the inner insulation layer 120 may be bonded to portions of outer circumferential surfaces of the core insulation layers 112 of the pair of insulated core wires 110, for example, through a thermal fusion. In other examples, the inner insulation layer 120 may be bonded to the portions of the outer circumferential surfaces of the core insulation layers 112 of the pair of insulated core wires 110, for example, by an adhesive. The inner insulation layer 120 is made of an insulation polymer material. For example, the inner insulation layer 120 may be made of an insulation material such as polytetrafluoroethylene (PTFE), polyethylene terephthalate (PET) or the like.

In some examples, fillers may be provided within a space defined between the core insulation layers 112 of the pair of insulated core wires 110 and the inner insulation layer 120 so as to provide a flexibility of the cable 100 during bending use and to further avoid the insulated core wires 110 from being displaced during use.

As shown in FIG. 1, the metal shielding layer 130 is wrapped around an outer circumferential surface of the inner insulation layer 120 to provide an electromagnetic shielding effect to the insulated core wires 110. For example, the metal shielding layer 130 may be in the form of a shielding strip and wound around the inner insulation layer 120 in the longitudinal direction. Presence of the inner insulation layer 120 can prevent the metal shielding layer 130 from entering a gap between the insulated core wires 110. For example, the metal shielding layer 130 may be bonded to the outer circumferential surface of the inner insulation layer 120 through the thermal fusion or by an adhesive. For example, the metal shielding layer 130 may include a conductive layer bonded to the inner insulation layer 120 by an adhesive, or fillers may be provided between the conductive layer 130 and the inner insulation layer 120 so as to further improve the stability of the cable 100. As an example, the conductive layer of the metal shielding layer 130 is made of aluminum or copper. For example, the conductive layer 130 may be an aluminum/polypropylene strip. However, it would be understood by those skilled in the art that the conductive layer of the metal shielding layer 130 may also be made of other conductive materials in some other embodiments of the present disclosure.

The outer insulation layer 140 is wrapped around an outer circumferential surface of the metal shielding layer 130, as shown in FIG. 1. The outer insulation layer 140 may also be in the form of an insulation material strip and wound around the metal shielding layer 130 in the longitudinal direction. The outer insulation layer 140 may be bonded to the outer circumferential surface of the metal shielding layer 130 through the thermal fusion or by an adhesive. The outer insulation layer 140 may be made of an insulation material such as polyester, polypropylene, polyethylene terephthalate (PET). In some examples, the outer insulation layer 140 may be formed by stacking a plurality of sub-insulation layers to enhance the flexibility of the cable 100 during bending use.

As shown in FIG. 1, the cable 100 according to an exemplary embodiment of the present disclosure further includes a single drain wire 150. The drain wire 150 is disposed between the metal shielding layer 130 and the outer insulation layer 140, and is located at a second side or an outer side of the core insulation layer 112 of one of the pair of insulated core wires 110 facing away from the other of the pair of insulated core wires 110 in a radial direction, and the second side is opposite to the first side in the radial direction. As an example, a center of the central conductor 111 of each of the pair of insulated core wires 110 is located in the same radial plane as a center of the drain wire 150, and the center of the drain wire 150 is located outside of the center of the central conductor 111 of the one of the pair of insulated core wires 110 in the radial direction.

For example, the drain wire 150 may be firmly pressed against the outer circumferential surface of the metal shielding layer 130 by the outer insulation layer 140. Compared with the related art where the drain wire 150 is located between the pair of insulated core wires 110 and is thus easy to be misplaced or displaced, in embodiments of the present disclosure, the drain wire 150 is disposed at the side of the one of the insulated core wires 110 facing away from the other of the insulated core wires 110, such that the drain wire 150 is firmly held and is prevented from being displaced during use. Use of the single drain wire 150 can reduce cost, reduce an outer contour of the cable 100, and facilitate layout and positioning of the cable 100.

In some embodiments of the present disclosure, the metal shielding layer 130 may be suitable to be electrically connected with an external ground to double as a drain wire. For example, a conductive surface of the metal shielding layer 130 may be arranged to face outwards, that is, to face toward the outer insulation layer 140, which facilitates an electrical connection between the metal shielding layer 130 and the external ground. In some examples, the conductive surface of the metal shielding layer 130 or its conductive layer may be in electrical contact with the drain wire 150, so as to better improve the electromagnetic shielding effect.

As illustrated in FIG. 1, the metal shielding layer 130 has a first end 131 and a second end 132 in a radial cross section. The first end 131 and the second end 132 are located at different positions in the circumferential direction, so that the metal shielding layer 130 is formed as a closed ring in the circumferential direction to further improve the electromagnetic shielding effect. Further, no joint or gap is formed in portions of the metal shielding layer 130 between the first end 131 and the second end 132, so as to prevent the joint or gap from becoming larger during the bending use of the cable 100 which may otherwise result in an incomplete shielding loop. For example, in the embodiment shown in FIG. 1, the first end 131 and the second end 132 of the metal shielding layer 130 are positioned at radially opposite outer sides of the inner insulation layer 120, respectively. As an example, the metal shielding layer 130 has overlapping portions 133 between the first end 131 and the second end 132, thereby further improving the electromagnetic shielding effect.

Figure 2A:
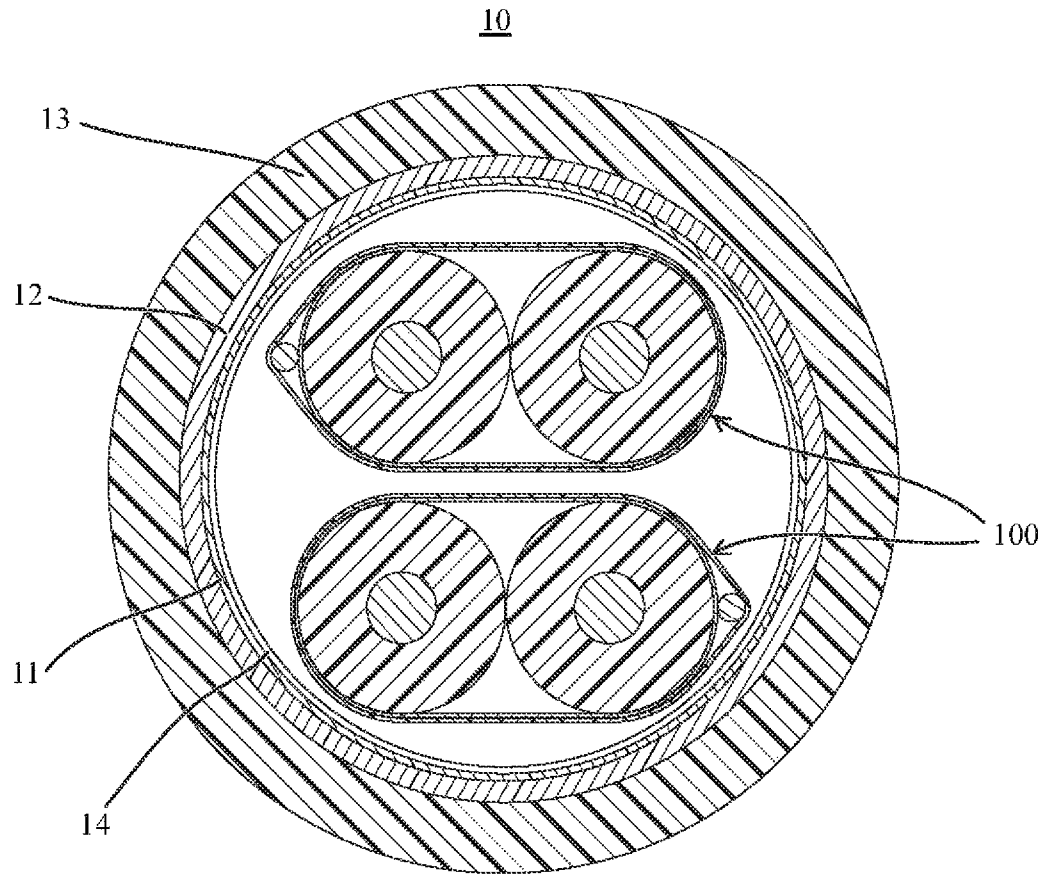
FIG. 2A is a sectional view of a cable assembly according to an embodiment.
Figure 2B:
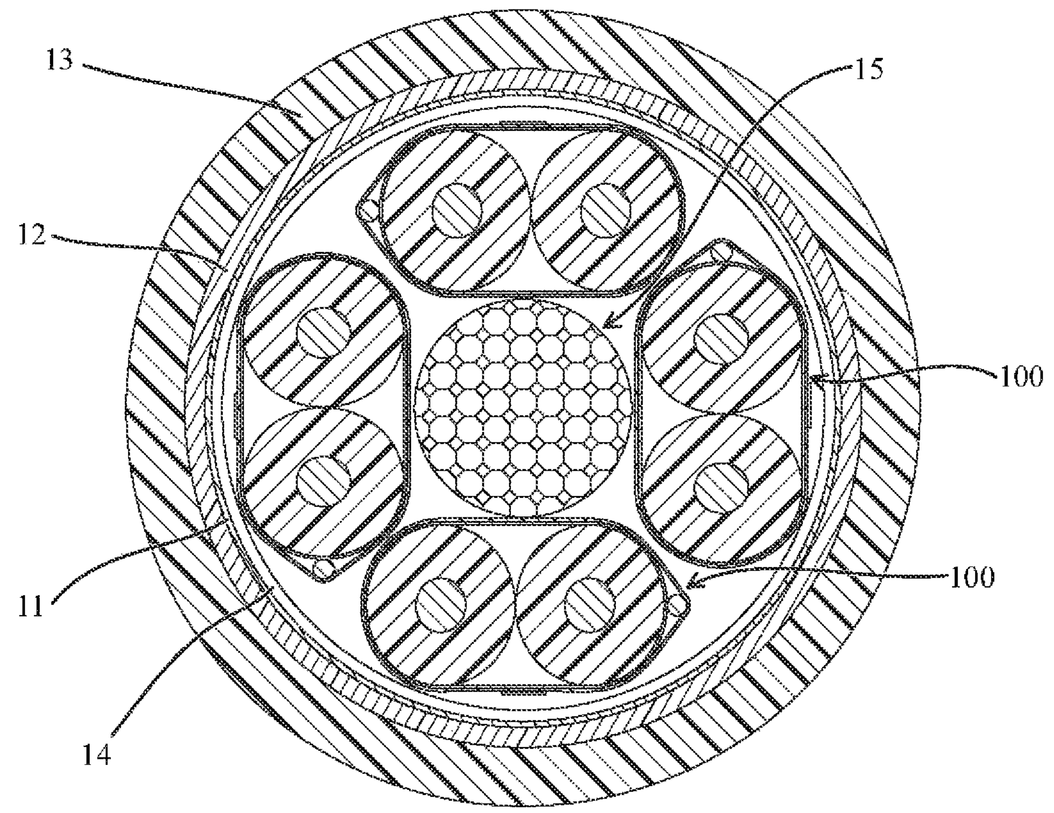
FIG. 2B is a sectional view of a cable assembly according to another embodiment.
Figure 2C:
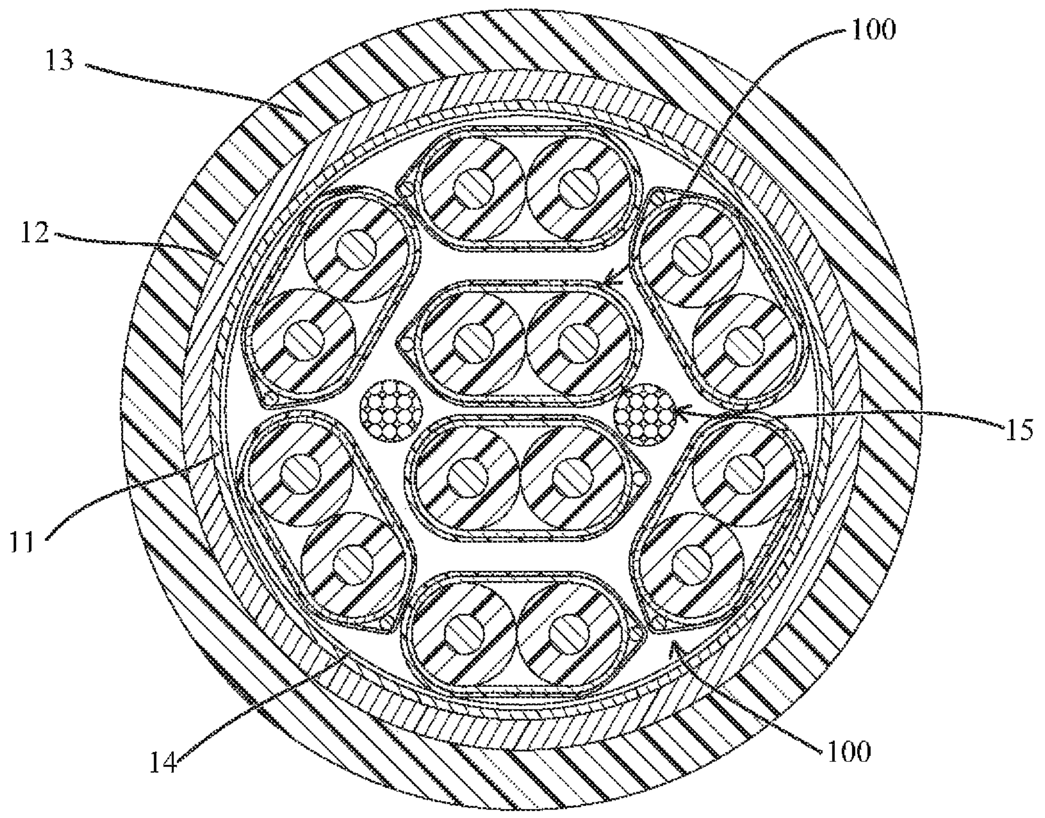
FIG. 2C is a sectional view of a cable assembly according to another embodiment.

According to embodiments of the present disclosure, there is also provided a cable assembly 10 that includes at least two cables 100 described herein and arranged in an outer sheath 13, as shown in FIGS. 2A to 2C. For example, these cables 100 may be twisted or intertwined with each other in the longitudinal direction, and the outer sheath 13 may be in the form of a sleeve, such as a metal tube or a plastic tube, to provide a certain protection function.

As shown in FIGS. 2A to 2C, the cable assembly 10 further includes a first shielding layer 11 and/or a second shielding layer 12 disposed in the outer sheath 13. The first shielding layer 11 is wrapped or wound around all the cables 100, and the second shielding layer 12 is wrapped or wound around the first shielding layer 11. The first shielding layer 11 and/or the second shielding layer 12 may provide an improved electromagnetic shielding effect for the cables 100, and may be in the form of a layer/strip of metal or other conductive materials.

In some embodiments, as shown in FIGS. 2A to 2C, the cable assembly 10 may further include a buffer layer 14, which is arranged between all the cables 100 and the first shielding layer 11 to provide external force buffering or vibration reduction effect.

In some embodiments, as shown in FIGS. 2B and 2C, the cable assembly 10 may further include fillers 15 which may at least partially fill a space defined between the cables 100 and/or between the cables 100 and the buffer layer 14 or the shielding layers 11, 12.

The cable assembly 10 may include two or more cables. FIG. 2A shows that the cable assembly 10 includes two cables 100, FIG. 2B shows that the cable assembly 10 includes four cables 100, and FIG. 2C shows that the cable assembly 10 includes eight cables 100. Therefore, more signals, data, or power transmission functions can be provided, and there is no signal interference between the cables 100.

Although embodiments of the present disclosure have been shown and described, it would be appreciated by those skilled in the art that changes or modification may be made to these embodiments without departing from the principles and spirit of the present disclosure, the scope of which is defined in claims and their equivalents. In addition, it should be noted that, the word "include", "comprise" or "have" doesn't exclude other elements or steps. In addition, any reference numerals in the claims should not be interpreted as a limitation to the scope of the present disclosure.

What is claimed is:

1. A cable, comprising:

a pair of insulated core wires extending parallel to each other in a longitudinal direction, each of the insulated core wires has a central conductor and a core insulation layer wrapped around the central conductor in a circumferential direction;

an inner insulation layer wrapped around the core insulation layers of the pair of insulated core wires, the core insulation layers of the pair of insulated core wires abut against each other on outer circumferential surfaces thereof at a pair of first sides of the core insulation layers facing toward each other;

a metal shielding layer wrapped around an outer circumferential surface of the inner insulation layer, a gap being formed between the metal shielding layer and the inner insulation layer;

an outer insulation layer wrapped around an outer circumferential surface of the metal shielding layer; and a single drain wire in contact with an end of the metal shielding layer and disposed between the metal shielding layer and the outer insulation layer, the single drain wire is located at a second side of the core insulation layer of one of the pair of insulated core wires facing away from the other of the pair of insulated core wires in a radial direction.

2. The cable according to claim 1, wherein a conductive surface of the metal shielding layer is arranged to face toward the outer insulation layer.

3. The cable according to claim 2, wherein the conductive surface of the metal shielding layer is in electrical contact with the single drain wire.

4. The cable according to claim 3, wherein the metal shielding layer has a first end and a second end in a radial cross section, the first end and the second end of the metal shielding layer are non-abutting and located at different positions in the circumferential direction and the metal shielding layer is formed as a closed ring in the circumferential direction.

5. The cable according to claim 2, wherein the metal shielding layer has a conductive layer having the conductive surface.

6. The cable according to claim 5, wherein the conductive layer is bonded to the inner insulation layer by an adhesive.

7. The cable according to claim 5, wherein a plurality of fillers are provided between the conductive layer and the inner insulation layer.

8. The cable according to claim 1, wherein a plurality of fillers are provided within a space defined between the core insulation layers of the pair of insulated core wires and the inner insulation layer.

9. The cable according to claim 1, wherein the metal shielding layer is electrically connected with an external ground.

10. The cable according to claim 9, wherein the metal shielding layer has a first end and a second end in a radial cross section, the first end and the second end of the metal shielding layer are located at different positions in the circumferential direction and the metal shielding layer is formed as a closed ring in the circumferential direction.

11. The cable according to claim 1, wherein a center of the central conductor of each of the pair of insulated core wires is located in a same radial plane as a center of the single drain wire.

12. The cable according to claim 11, wherein the metal shielding layer has a first end and a second end in a radial cross section, the first end and the second end of the metal shielding layer are located at different positions in the circumferential direction and the metal shielding layer is formed as a closed ring in the circumferential direction.

13. The cable according to claim 1, wherein the end of the metal shielding layer has a first end and a second end in a radial cross section, the first end and the second end of the metal shielding layer are located at different positions in the circumferential direction and the metal shielding layer is formed as a closed ring in the circumferential direction.

14. The cable according to claim 13, wherein the first end and the second end of the metal shielding layer are positioned at radially opposite sides of the inner insulation layer.

15. The cable according to claim 13, wherein the metal shielding layer has an overlapping portion between the first end and the second end.

16. The cable according to claim 1, wherein the cable is an electrical cable suitable for data transmission at a rate of 20 Gbps to 40 Gbps.

17. A cable assembly, comprising:

a pair of cables, each of the cables is the cable of claim 1;

a first shielding layer wrapped around the pair of cables;

a second shielding layer wrapped around the first shielding layer; and an outer sheath sleeved over an outer circumferential surface of the second shielding layer.

18. The cable assembly according to claim 17, further comprising a buffer layer arranged between the pair of cables and the first shielding layer.

19. The cable assembly according to claim 17, further comprising a plurality of fillers at least partially filling a space defined between the pair of cables.

20. The cable assembly according to claim 17, wherein the cable assembly has two, four, eight or more cables.

* * * * *